United States Patent
Imai et al.

(10) Patent No.: US 6,807,360 B1
(45) Date of Patent: Oct. 19, 2004

(54) DIGITAL IMAGE RECORDING SYSTEM

(75) Inventors: Akihiko Imai, Kyoto (JP); Kazutaka Sakamoto, Hirakata (JP)

(73) Assignee: Optex Co., Ltd., Shiga (JP)

( * ) Notice: Subject to any disclaimer, the term of this patent is extended or adjusted under 35 U.S.C. 154(b) by 692 days.

(21) Appl. No.: 09/806,233

(22) PCT Filed: Jul. 27, 2000

(86) PCT No.: PCT/JP00/05037
§ 371 (c)(1),
(2), (4) Date: Mar. 28, 2001

(87) PCT Pub. No.: WO01/08416
PCT Pub. Date: Feb. 1, 2001

(30) Foreign Application Priority Data

Jul. 28, 1999 (JP) .......................................... 11-214311

(51) Int. Cl.$^7$ ..................... H04N 5/91; H04N 5/781; H04N 7/18
(52) U.S. Cl. .................... 386/46; 386/124; 348/143
(58) Field of Search ............................ 386/46, 38, 40, 386/52, 55, 107, 117, 124, 125, 126, 1, 4; 348/143, 144, 159, 207.99, 222.1; H04N 5/91, 5/781, 7/18

(56) References Cited

U.S. PATENT DOCUMENTS 4,630,110 A * 12/1986 Cotton et al. ............... 348/153
6,456,321 B1 * 9/2002 Ito et al. ...................... 348/143

FOREIGN PATENT DOCUMENTS

| JP | 61-179694 | 8/1986 |
| JP | 6-113251 | 4/1994 |
| JP | 8-265737 | 10/1996 |
| JP | 9-182062 | 7/1997 |
| JP | 9-259381 | 10/1997 |
| JP | 409265525 A * | 10/1997 |
| JP | 10-290449 | 10/1998 |
| JP | 11-164289 | 6/1999 |

* cited by examiner

*Primary Examiner*—Robert Chevalier
(74) *Attorney, Agent, or Firm*—Wenderoth, Lind & Ponack, L.L.P.

(57) ABSTRACT

The digital image recording system of the present invention comprises event storage unit for storing, on occurrence of an event, the order of such occurrence, importance level storage unit for storing the importance level of the event, and image acquisition unit for sequentially importing the image information from a plurality of image taking unit connection with each event and recording it in accordance with the information stored in these storage unit. On generation of an alarm, the image acquisition unit also stores, by multiprocessing, alarm image information provided from corresponding image taking unit. On occurrence of an event, the event storage unit stores the channel number for the corresponding image taking unit in the order of event occurrence, but does not additionally store such channel if the event storage unit already contains the same channel number as the one for the image taking unit in connection with the event occurrence.

6 Claims, 6 Drawing Sheets

Fig.3

Queue

| 1 | 2 | 3 | -------- | n-2 | n-1 | n |

Fig.4

Queue                                    Qq

| 3 | 4 | 5 | -------- | n | 2 | |

Fig.5

Event type work

| 1 | 2 | 3 | -------- | n-2 | n-1 | n |
| | L | H | -------- | | | |

Fig.6
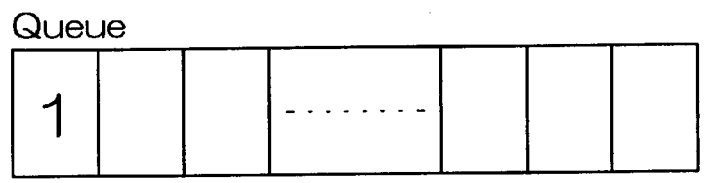
(a)
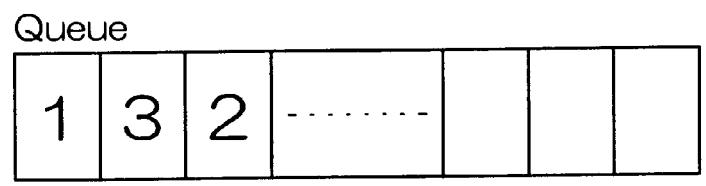
(b)

ly used a surveillance video system which uses a magnetic tape or the like and records image signals from an image taking device such as a surveillance camera. However, the system of this type, which records analog signals on a magnetic tape, is troubled with deterioration of recorded images and complex maintenance involving tape exchange, etc. To solve such problems, recent attempts have been directed to development of a digital image recording system which applies the digital technology and utilizes a hard disk or the like as the recording medium (e.g. Japanese Patent Laid-open Application H6-113251 (JP-A-1994-113251)).

DIGITAL IMAGE RECORDING SYSTEM

TECHNICAL FIELD

The present invention relates to a digital image recording system which is used for security purpose, etc. and capable of recording images on occurrence of events. In particular, the present invention relates to a measure for providing a system which can avoid missing important image information, without necessarily using a high-speed image acquisition device.

BACKGROUND ART

As a conventional surveillance image recording system for security or like purpose, there has been widely utilized a surveillance video system which uses a magnetic tape or the like and records image signals from an image taking device such as a surveillance camera. However, the system of this type, which records analog signals on a magnetic tape, is troubled with deterioration of recorded images and complex maintenance involving tape exchange, etc. To solve such problems, recent attempts have been directed to development of a digital image recording system which applies the digital technology and utilizes a hard disk or the like as the recording medium (e.g. Japanese Patent Laid-open Application H6-113251 (JP-A-1994-113251)).

In the system of this type, image information on a surveillance area is recorded either intermittently at predetermined time intervals (intermittent recording mode) or only when an alarm is inputted by a sensor or the like (e.g. Japanese Patent Laid-open Application H10-290449 (JP-A-1998-290449)). Generally, the system of this type employs several cameras. In this case, the recording pattern of each camera is set depending on its built environment, so that image information on the surveillance area can be intermittently recorded in accordance with this setting. Otherwise, a recording mode is set on the image recording device in such a manner that an alarm signal from a sensor, etc. triggers image recording around the alarm signal transmission time, whereby images are recorded as specified by such setting.

Nevertheless, because this system of conventional type records an image simultaneously with the occurrence of an event, the speed of the image acquisition device governs the speed of the whole system. For example, a high-performance system can be constructed with an image acquisition device capable of getting 30 images per second. In contrast, with an image acquisition device capable of getting as little as about 10 images per second, the performance of this system is seriously degraded in comparison with that of the former. In other words, the latter system may fail to record image information on some of event occurrences, when 10 or more events take place in a second. Therefore, in an attempt to avoid missing image information, a conventional system has been constructed using a high-speed image acquisition device.

Nonetheless, where the recording mode is set for every camera as described earlier, valuable information in the surveillance area (e.g. presence of an intruder) may be missed during the intermittent recording mode operation. On the other hand, according to the recording mode where an image is recorded only on acquisition of an event, no image can be recorded before transmission of an alarm signal.

As a solution to these problems, use of a plurality of image recording systems has been suggested. But this measure is not practical, not only because of the necessity for a large installation space to accommodate the resultant huge system, but also because of the increase of the cost for the whole system.

From the viewpoint of reducing the cost for the system, it is effective to use a relatively low-speed image acquisition device which obtains about 10 images per second.

However, when the low-speed image acquisition device is mounted on the conventional system without any arrangement, the system fails to record the image information on some of event occurrences as mentioned above. The system may miss valuable image information depending on the situation, thus being unsatisfactory in terms of reliability.

Further, where the number of channels is increased to deal with multichannel applications, it is necessary to forbid an asynchronous input by each channel and to depend exclusively on a synchronous switching. Otherwise, to allow asynchronous inputs, the image acquisition devices are required as many as the channels.

Nevertheless, synchronous switching causes unnecessary switching of cameras, which tremendously increases the volume of recorded information. On the other hand, to allow asynchronous inputs, a large number of image acquisition devices are necessary, which inevitably raises the cost for the whole system.

The present invention has been worked out in view of these concerns. Its object is to provide an image recording system utilizing a relatively low-speed image acquisition device, in which the single image acquisition device is capable of recording image information from a plurality of cameras without fail.

DISCLOSURE OF THE INVENTION

In order to accomplish the above object, the present invention separates the input of an event and the acquisition of image information, and allows an event input operation and an image information acquisition operation to proceed asynchronously. As a consequence, even if the image information acquisition means operates at a relatively low speed, image information can be obtained without fail, as far as the speed of the event input means is fast enough relative to that of the event occurrence.

In this specification, it should be understood that "image information" not only indicates "data of an image itself" but also includes various incidental information (diverse information such as the importance of an obtained image).

A digital image recording system of the present invention is described with reference to FIG. 1. The image recording system comprises a plurality of image taking means 2, 2, . . . , recording means 4 which is capable of recording image information taken by the image taking means 2, 2, . . . , event storage means 5 for storing, on occurrence of events, the order of such occurrences, and image acquisition means 3 which imports the image information from the image taking means 2 in connection with the event, according to the order of event occurrences stored in the event storage means 5, and which records the image information on the recording means 4.

In this arrangement, when there happen a plurality of events to be regarded as image import requests, the event storage means 5 starts to store the order of event occurrences. Even if many events take place in a short period, the event storage means 5 stores the order of each occurrence, without missing important information. Based on and in compliance with the order of event occurrences stored in the storage means 5, the image acquisition means 3 imports image information from the image taking means 2 in connection with the event, and records the image information on the recording means 4. Therefore, even though the image acquisition means 3 imports images at a low speed, the image information on the events is recorded on the recording means 4 in the order of such occurrences, so that the image information can be imported without fail. Besides, the image acquisition means 3 need not be installed in plurality in correspondence with the number of the image taking means 2. Namely, irrespective of the speed of event occurrences, the single image acquisition means 3 is capable of recording image information without fail from a plurality of image taking means 2, 2, . . .

The image acquisition means 3 may be further capable of conducting multiprocessing of intermittent image information which is intermittently imported from the image taking means 2 and alarm image information which is transmitted, on generation of an alarm, from the image taking means in connection with such alarm generation.

With regard to the channel for importing image information from the single image taking means 2 into the image acquisition means 3, this arrangement does not require an independent channel for intermittent image information and another channel for alarm image information. In other words, the image acquisition means 3 can import both information via one channel only. The expression "on generation of an alarm" as used herein indicates, for example, the moment when an alarm signal is transmitted by a sensor for detecting an intruder or when a human-operated alert switch is turned on.

Further, there may be provided importance level storage means 6 for recognizing and storing the level of importance of events, when the event storage means stores the order of event occurrences. Afterwards, when the image information on each event is recorded on the recording means 4, the importance level of each event can be added to the image information.

With this arrangement, the information indicating the importance level of the image information is recorded on the recording means 4. Hence, it is possible to retrieve and fetch only the information of particular value (the information with a high level of importance) among a volume of image information recorded on the recording means 4.

Furthermore, the event storage means 5 can be arranged to store, on occurrence of events and in the order of event occurrences, the channel number corresponding to the image taking means in connection with each event. Besides, provided that the channel number for the image taking means 2 in connection with one of such events is the same as the one already existing in the event storage means 5 at the time of that event occurrence, the channel number corresponding to the image taking means in connection with the late event is excluded from additional storage. In this case, the importance level storage means 6 compares the levels of importance of both events related to the same channel number. Only when the event to be stored shows a higher level of importance, the importance level of the event to be stored is stored in replacement of the importance level of the existing event.

Even when a plurality of events take place in a short period of time in connection with a certain channel number, this arrangement prohibits the event storage means from additionally storing the same channel number on every occurrence. Thus, it is possible to prevent disproportionate import of image information from a particular channel, so as not to affect image import timing of other channels. If image information is imported excessively from a certain channel, particularly when the image acquisition means 3 operates at a relatively low speed, the import of image information from other channels may be hampered. On the contrary, the present arrangement can prevent such a situation.

BRIEF DESCRIPTION OF DRAWINGS

FIG. 3 shows an example of the initial queue state in the "intermittent import" operation in the embodiment of the present invention.

FIG. 4 shows an example of the queue state, when an alarm is generated in the "intermittent import" operation in the embodiment of the present invention.

FIG. 5 shows an example of the event type work, written with the event information, in the embodiment of the present invention.

FIG. 6 shows an example of how the queue changes on generation of an alarm in the embodiment of the present invention.

BEST MODE FOR CARRYING OUT THE INVENTION

A preferable embodiment of the present invention is hereinafter described with reference to the drawings. In this embodiment, the present invention is applied to a home security system.

Figure 1:
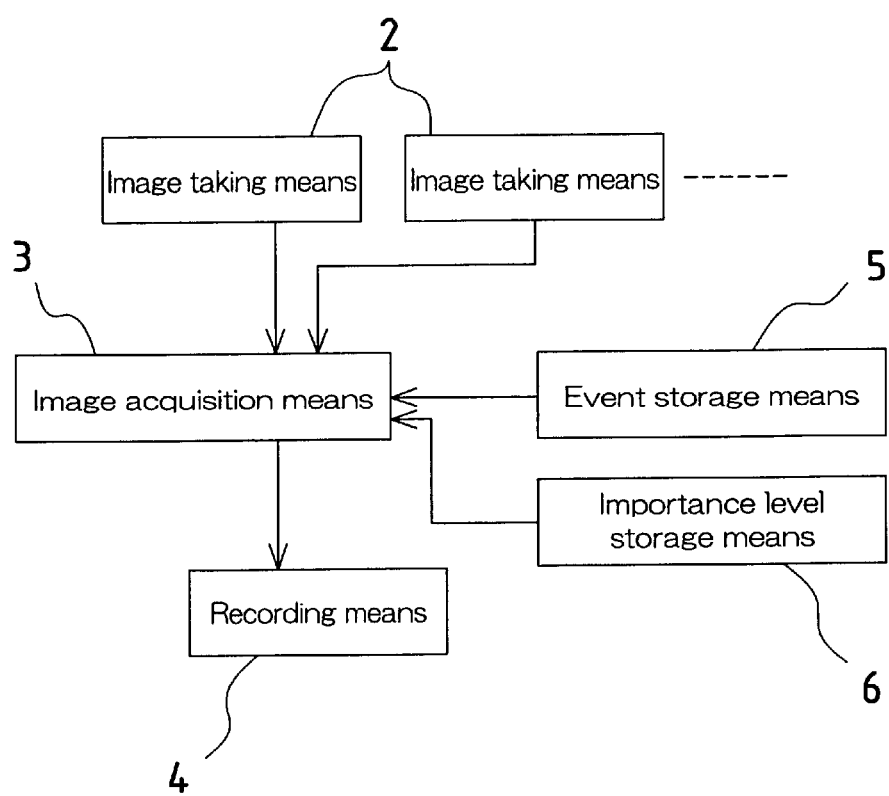
FIG. 1 is a block diagram showing the basic concept of the arrangement of the present invention.
Figure 2:
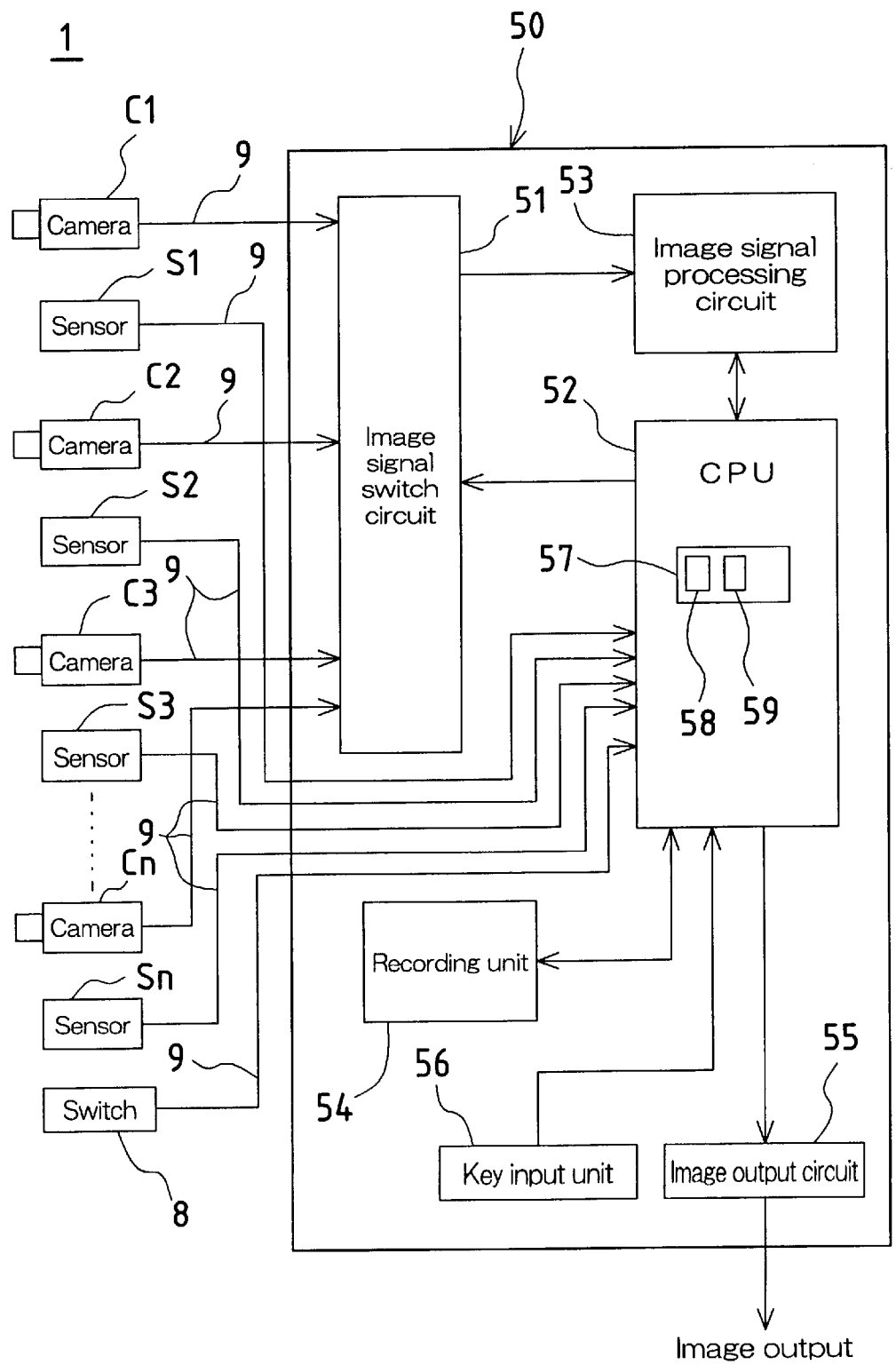
FIG. 2 shows an entire construction of the digital image recording system in the embodiment of the present invention.

FIG. 2 is a block diagram showing an entire construction of the digital image recording system 1 according to the present embodiment.

As illustrated in FIG. 2, this image recording system 1 comprises a plurality (n units) of cameras C1, C2, C3, . . . Cn as the image taking means, a plurality (n units) of sensors S1, S2, S3, . . . Sn disposed in correspondence with the cameras C1, C2, C3, . . . Cn, and an alert switch 8 (mounted on a wall or composed of a portable remote controller or the like) which is operated by a resident of a house. Each of the cameras C1, C2, C3, . . . Cn films its own surveillance area (e.g. entrance hall, garden, corridor). Each of the sensors S1, S2, S3, . . . Sn detects the presence of a human in the surveillance area of the respective camera C1, C2, C3, . . . Cn. For example, each sensor is constituted with a pyroelectric sensor which detects an intruder by catching an infrared energy radiated from the human body. The alert switch 8 is operated by a resident who realizes the presence of an intruder. On activation of the alert switch 8, a notice is sent to the security company, for example.

The cameras C1, C2, C3, . . . Cn, the sensors S1, S2, S3, . . . Sn, and the alert switch 8 are respectively connected to an image recording device 50 via cables 9, 9, . . .

The image recording device 50 includes an image signal switch circuit 51 as the image acquisition means, a CPU 52, an image signal processing circuit 53, a recording unit 54 as the recording means, an image output circuit 55 and a key input unit 56.

The image signal switch circuit 51 is connected with the cameras C1, C2, C3, . . . Cn, and capable of importing image information from any one camera selected among the cameras C1, C2, C3, . . . Cn, by way of a channel which corresponds to the selected channel. The image signal switch circuit 51 imports a relatively small number of images per unit time (i.e. its import speed is slow). For example, it has a capacity of importing 10 images per second, or a capacity of importing a static image at 0.1 second intervals.

The CPU 52 is connected with the sensors S1, S2, S3, . . . Sn as well as the alert switch 8, so as to receive alarm signals from the sensors S1, S2, S3, . . . Sn and a switch signal from the alert switch 8. On receipt of an alarm signal from any of the sensors S1, S2, S3, . . . Sn, the CPU 52 identifies the channel number of a camera which corresponds to the alarm signal-producing sensor.

The CPU 52 has a memory 57 for storing "setting information on channel image import" which is entered by the key input unit 56 such as a keyboard (not shown) The "setting information on channel image import" means various setting information concerning the image import from each channel, which includes the order of importing channel images and the timing of switching channels for importing images (switch time interval) during the intermittent import operation.

The memory 57 includes a queue unit 58 as the event storage means, with the queue unit 58 having a storage area called "queue" for storing the order of event occurrences (the order of importing images). The "queue" comprises as many "queue areas" as the channels (cameras). According to the import order, each of these "queue areas" is fed with a channel number from which image information should be imported via the image signal switch circuit 51 to the image signal processing circuit 53. For example, FIG. 3 shows the initial queue state in the intermittent import operation, in which the first area at the head (the left end in the figure) is inputted with Channel No. 1, the second area at the second place with Channel No. 2, the third area at the third place with Channel No. 3, and the n-th area at the tail (the right end in the figure) with Channel No. n. Thus, each area is provided with a corresponding channel number. In this condition, the image information from each of the cameras C1, C2, C3 is imported via the image signal switch circuit 51 into the image signal processing circuit 53, in the order of Channel No. 1, Channel No. 2 and Channel No. 3. In the end, the image information from the camera Cn for Channel No. n is imported into the image signal processing circuit 53 via the image signal switch circuit 51. During this process, after image information from Channel No. 1 is imported into the image signal processing circuit 53 via the image signal switch circuit 51, the channel number in each area moves by one area toward the head (to the left in the figure). As a result, the first area is inputted with Channel No. 2, the second area with Channel No. 3, the third area with Channel No. 4, and the (n−1)-th area with Channel No. n. Next, with image information from Channel No. 2 being imported to the image signal processing circuit 53 via the image signal switch circuit 51, the channel number in each area moves again by one area toward the head. In this manner, image information is obtained as specified by the channel number at the first area, so that the image signal processing circuit 53 can import the image information via the image signal switch circuit 51, based on the order of channel numbers in the "queue".

The order of channel numbers should not be limited to the above-mentioned sequence, but can be optionally set by entering "setting information on channel image import" using the key input unit 56.

The channel number is also altered on transmission of an alarm signal from the sensor S1, S2, S3, . . . Sn or a switch signal from the alert switch 8. In this situation, in order to import image information from a channel corresponding to the sensor S1, S2, S3, . . . Sn or the alert switch 8 which has given out the signal, the corresponding channel number is added to an empty area at the tail of the queue. To give a few examples, if the sensor S2 installed in a garden produces an alarm signal, Channel No. 2 assigned to the garden surveillance camera C2 is put in the "queue". Likewise, if the alert switch 8 is pressed, Channel No. 3 for the camera C3 (e.g. corridor surveillance camera) is added to the "queue". FIG. 4 shows an example of the queue on generation of an alarm, while image information from each channel is imported via the image signal switch circuit 51 to the image signal processing circuit 53, in the above-mentioned order (during "intermittent import" operation). The queue state of this example indicates that an alarm signal is produced by the sensor S2 which corresponds to Channel No. 2, while image information from Channel No. 3 is imported into the image signal processing circuit 53 through the image signal switch circuit 51. As illustrated, Channel No. 2 is provided in the empty area Qq at the end of the "queue".

In addition, the memory 57 in the CPU 52 has an event type work unit 59, which includes a storage area, called "event type work", for storing information on the current event type of every channel. The "event type work" stores the information on the event type concerning each channel number currently waiting in the "queue" (the channel number according to which image information is going to be imported via the image signal switch circuit 51 into the image signal processing circuit 53). Examples of the event types include the following three types. The first event type is "intermittent import", where image information is imported through the image signal switch circuit 51 into the image signal processing circuit 53 in the preset order stored in the memory 57 as the "setting information on channel image import". The second event type is "sensor alarm", where image information is read out, on transmission of an alarm signal by one of the sensors S1, S2, S3, . . . Sn, from a channel which corresponds to the signal-producing sensor. The third event type is "switch alarm", where image information is read out from a certain channel when a resident operates the alert switch 8. These event types are written as event type information. The second event type "sensor alarm" is written as the event type information "L", whereas the third event type "switch alarm" is marked as the event type information "H". As to the first event type "intermittent import", no event type information is written on the "event type work". For the event type "sensor alarm", the event type information is added to the channel number which corresponds to the alarm signal-producing sensor. FIG. 5 shows an example of the event type work filled with the event information. In FIG. 5, Channel No. 2 is added with "L", indicating the sensor S2 for Channel No. 2 has produced an alarm signal. Also, Channel No. 3 is provided with "H" in connection with the operation of the alert switch 8.

As above, on occurrence of an event, not only is a channel number written on the "queue", but also its event type is written on the "event type work".

FIG. 6 represents an example of how the queue changes on generation of an alarm. In the state shown in FIG. 6(a), the "queue" is provided with Channel No. 1 only. When this state turns into the state shown in FIG. 5 above (the state where "H" is added to Channel No. 3 in response to the operation of the alert switch 8 and also where "L" is added to Channel No. 2 on transmission of an alarm signal from the sensor S2), Channel Nos. 3 and 2 are entered at the tail of the queue as shown in FIG. 6(b), together with indications of the "event type work" as described in FIG. 5. From this state, the image from Channel No. 1 is imported via the image signal switch circuit 51 into the image signal processing circuit 53. Next, when the image information from Channel No. 3 is imported into the image signal processing circuit 53, the information imported into the image signal processing circuit 53 contains the image information from the camera C3, and the event type information "H" which is added by making reference to the "event type work". Likewise, when the image information of Channel No. 2 is later imported to the image signal processing circuit 53, the information imported into the image signal processing circuit 53 contains the image information from the camera C2, and the event type information "L" which is added by referring to the "event type work".

Further, the information on the "event type work" is assigned with a priority (level of importance). A higher priority is given to image information of greater value. In this embodiment, the priority of information increases in the order of "intermittent import", "sensor alarm" and "switch alarm".

In writing the event type on the "event type work", if a channel number to be written is the same as the one already present in the "queue", the channel number to be written is not added to the tail of the "queue", but compared with the existing channel of the same number for their event types. If the channel number waiting in the "queue" is marked with an event type of higher priority than the channel number to be written, the event type information to be written is cancelled. On the other hand, if the channel number to be written shows an event type of higher priority than the channel number waiting in the "queue", the event type information of the existing channel number on the "event type work" is renewed with the event type information to be written. By way of example, it is supposed that the sensor S2 for Channel No. 2 has produced an alarm signal in the "queue" state shown in FIG. 3, where no event type information is written on the "event type work" (where the event type of all channels is "intermittent import"). In this case, instead of adding Channel No. 2 at the tail of the "queue", "L" is written on the second channel on the "event type work". Thereby, when the image from Channel No. 2 is imported into the image signal processing circuit 53, the imported image information is added with the event type "L". As a similar example, a switch signal is supposed to be generated by operation of the alert switch 8 in the "queue" state shown in FIG. 3, where the third channel on the "event type work" is added with "L" (where an event was triggered by alarm signal transmission from the sensor S3). In this case, Channel No. 3 is not added to the tail of the "queue", and, instead, the third channel on the "event type work" has its event type renewed from "L" to "H". Eventually, when the image from Channel No. 3 is imported into the image signal processing circuit 53, the imported image information is added with the event type information "H".

Based on the "queue" mentioned above, an image signal is sequentially read into the image signal switch circuit 51. In the image signal processing circuit 53, the image signal is converted from analog to digital, compressed, etc., and then transmitted to the CPU 52.

The image signal transmitted to the CPU 52 is later recorded in the form of digital information in the recording unit 54, which is constituted with a hard disk, a flash memory or the like.

The image output circuit 55 produces an image signal which allows an output device such as a CRT (not shown) to display an image.

The key input unit 56 serves to set the order of importing image information into the image signal processing circuit 53, in the absence of an alarm signal from the sensors S1, S2, S3, . . . Sn and a switch signal from the alert switch 8; to output the image information recorded on the recording unit 54 to the image output circuit 55; and to supply the CPU 52 with a key input signal for retrieving a certain image data from a volume of image data recorded on the recording unit 54.

The following description relates to an example of the basic operation of the digital image recording system 1 as structured above.

During the above "intermittent import" operation, channel numbers are sequentially inputted into the "queue", as shown in FIG. 3. Once the image information is imported from Channel No. 1 to the image signal processing circuit 53, the channel number in each area moves by one area toward the head. At the same time, Channel No. 1 is entered at the tail end area in the queue. In this manner, image information (intermittent image information) is imported sequentially from each channel into the image signal processing circuit 53. By way of example, where the "intermittent import" is set to be carried out by switching cameras twice a second, the image signal processing circuit 53 receives static images from different cameras sequentially at 0.5 second intervals, through the image signal switch circuit 51. In other words, provided that the present system 1 is equipped with ten cameras, it takes five seconds to import image information from all cameras, through the image signal switch circuit 51, to the image signal processing circuit 53. Every time image information is imported into the image signal processing circuit 53, the image information is converted from analog to digital, compressed, etc. in the image signal processing circuit 53, transmitted via the CPU 52, and recorded on the recording unit 54. As far as the operation is limited to the "intermittent import" (where neither alarm signal nor switch signal is generated), no event type information is written on the "event type work".

When the sensor S1, S2, S3, . . . Sn detects an intruder or when a resident activates the alert switch 8, a channel number which corresponds to the alarm signal or switch signal is entered into the queue area at the tail of the "queue" (In FIG. 4, Channel No. 2 is entered in the empty area at the tail of the "queue", in response to an alarm signal produced by the sensor S2). Simultaneously, event type information is provided on the "event type work" according to the signal, whereby the alarm signal and the switch signal are indicated by "L" and "H", respectively. At this moment, if the channel number on which an event type is about to be written is the same as the channel number waiting in the queue, the channels of the same number are compared with each other for their event types. When the channel number waiting in the "queue" is indicated by an event type of higher priority than the channel number to be written, the event type information to be written is cancelled. On the other hand, when the channel number to be written shows an event type of higher priority than the channel number waiting in the "queue", the event type information of the channel number on the "event type work" is renewed with that of the channel number to be written.

With the event type information being thus written on the "event type work", the image of such channel number, which is imported through the image signal switch circuit 51 into the image signal processing circuit 53, contains not only the image information from the camera (alarm image information) but also the event type information "L" or "H". Addition of the event type enhances the convenience in retrieving the image information recorded on the recording unit 54. Specifically, the information marked with the event type "L" or the event type "H" can be exclusively retrieved and fetched from a volume of image information recorded on the recording unit 54.

Figure 7:
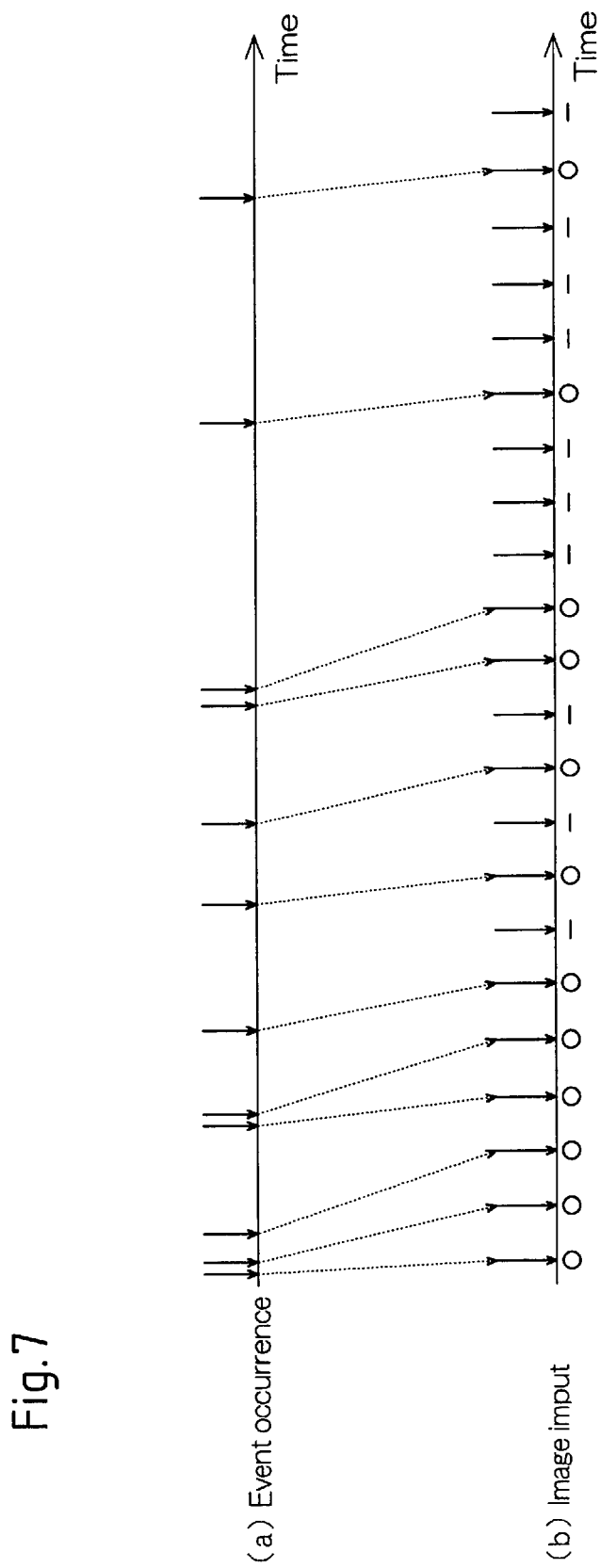
FIG. 7 is a time chart which illustrates the moments of event occurrences and the timing of importing image information in the embodiment of the present invention, where the channel number is entered on every event occurrence.

With regard to the present embodiment, FIG. 7 is a time chart showing the moments of event occurrences and the timing of importing image information, in the case where a channel number is entered in the queue at every event occurrence, instead of "intermittent import". The arrows in FIG. 7(*a*) indicate the moments of event occurrences. FIG. 7(*b*) shows the timing of importing image information in accordance with the order of event occurrences, via the image signal switch circuit 51 into the image signal processing circuit 53. In this figure, the sign "O" indicates the presence of an imported image, and the sign "–" represents the absence of an imported image.

Figure 8:
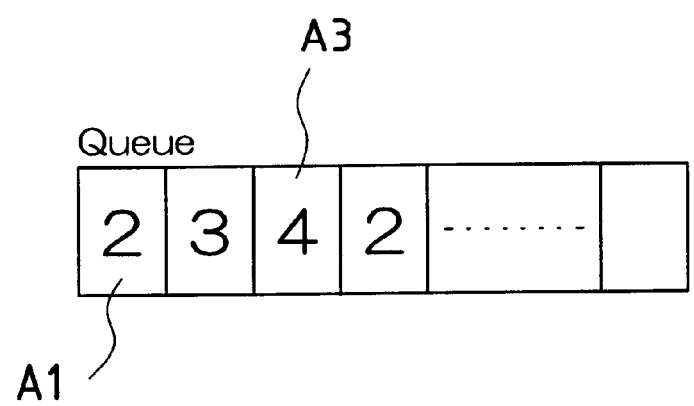
FIG. 8 is an example of the queue state, describing an operation where priorities are assigned among the channels in the embodiment of the present invention.

In another respect, although the above embodiment places priorities on the event types, priorities may be designated among the channels. To give an example, a higher priority may be set on a lower channel number. Referring to the "queue" state shown in FIG. 8, if occurrence of an event is observed through the first channel, Channel No. 2 in the first area A1 is deleted for the input of Channel No. 1. In another case, if occurrence of an event is recognized through the third channel, Channel No. 4 in the third area A3 is deleted to enter Channel No. 3. In this modification, the system can import image information based on the importance level in regard to surveillance, which can be set on each surveillance area, for example, as an area where surveillance of intruders is particularly significant or an area where such surveillance is less significant.

Additionally, priorities can be given on both the event types and the channels.

As described above, this embodiment separates the input of an event and the acquisition of image information, and allows an event input operation and an image information acquisition operation to proceed asynchronously. Hence, even if the image signal switch circuit 51 as the image information acquisition means may operate relatively slowly, image information can be obtained without fail, as far as the queue unit 58 as the event input means functions fast enough relative to the speed of event occurrences. Consequently, with the use of the relatively inexpensive image signal switch circuit 51 and the image signal processing circuit 53, it is possible to get image information and record it on the recording unit 54 without missing an event. Besides, the image information is obtainable within a delay time calculated as "the number of channels" multiplied by "the maximum speed of the image signal switch circuit". Such system performance is sufficient for security purpose.

From another aspect, since the single image signal switch circuit 51 can deal with a plurality of channels, the whole system is constructed in a simple structure at a further reduced cost.

It should be noted that application of the present invention is not limited to the home security system as detailed in the above embodiment, and that the present invention is also applicable to security systems for offices, shops, etc.

As for the cameras and the sensors, they may be separately disposed as in the above embodiment, or may be integrated as a sensor-mounted camera.

Besides, as for the intruder detection means, a pyroelectric sensor used herein can be substituted with various detection means (e.g. a motion detector) which detects an intruder based on the change of the brightness or the like in the surveillance area.

From yet another aspect, a security system needs to retain a continuous long-term record, whereas the recording unit 54 has a limited recording capacity. Therefore, modification may be made to appropriately delete image information having an event type of low importance and to overwrite new image information.

Industrial Applicability

As has been described, with the use of relatively inexpensive image acquisition means, the digital image recording system of the present invention is capable of obtaining and recording image information almost equally from every channel without missing an important event. Thus, the system is highly reliable and economical. Besides, because the single image acquisition means can deal with a plurality of channels, the whole system can be advantageously constructed in a simple structure at a lower cost, compared with the structure of providing image acquisition means for every channel. Moreover, the system allows easy handling of the recorded image information, thus working effectively with high practicality.

What is claimed is:

1. A digital image recording system which comprises:
    a plurality of image taking means;
    recording means capable of recording image information taken by the image taking means;
    event storage means for storing, on occurrence of an event, an order of each occurrence; and
    image acquisition means for sequentially importing the image information from the image taking means in connection with the event, in accordance with the order of event occurrence stored in the event storage means, and for recording the imported image information on the recording means.

2. A digital image recording system according to claim 1, wherein the image acquisition means performs multiprocessing of intermittent image information which is intermittently imported from the image taking means and alarm image information which is provided, on generation of an alarm, from the image taking means in connection with the alarm generation.

3. A digital image recording system according to claim 1, which further comprises importance level storage means for recognizing and storing a level of importance of the event when the event storage means stores the order of event occurrence,
    wherein the importance level of the event stored on the importance level storage means is added to the image information when the image information on each event is recorded on the recording means.

4. A digital image recording system according to claim 3, wherein the event storage means stores, on occurrence of an event and in the order of event occurrence, a channel number which corresponds to the image taking means in connection with the event, and, if the channel number of the image taking means in connection with the event is the same as the one already existing in the event storage means at the time of such event occurrence, the channel number which corresponds to the image taking means in connection with the event is excluded from additional storage; and
    wherein the importance level storage means compares importance levels of both events related by the same channel number, and, only when the event to be stored shows a higher level of importance, the importance level storage means stores the importance level of the event to be stored, in replacement of the importance level of the existing event.

5. A digital image recording system according to claim 2, which further comprises importance level storage means for recognizing and storing a level of importance of the event when the event storage means stores the order of event occurrence, wherein the importance level of the event stored on the importance level storage means is added to the image information when the image information on each event is recorded on the recording means.

6. A digital image recording system according to claim 5, wherein the event storage means stores, on occurrence of an event and in the order of event occurrence, a channel number which corresponds to the image taking means in connection with the event, and, if the channel number of the image taking means in connection with the event is the same as the one already existing in the event storage means at the time of such event occurrence, the channel number which corresponds to the image taking means in connection with the event is excluded from additional storage; and wherein the importance level storage means compares importance levels of both events related by the same channel number, and, only when the event to be stored shows a higher level of importance, the importance level storage means stores the importance level of the event to be stored, in replacement of the importance level of the existing event.

* * * * *